United States Patent [19]

Reddington

[11] Patent Number: 4,554,631

[45] Date of Patent: Nov. 19, 1985

[54] KEYWORD SEARCH AUTOMATIC LIMITING METHOD

[75] Inventor: Thomas B. Reddington, Kingwood Township, Hunterdon County, N.J.

[73] Assignee: AT&T Bell Laboratories, Murray Hill, N.J.

[21] Appl. No.: 513,158

[22] Filed: Jul. 13, 1983

[51] Int. Cl.⁴ .............................................. G06F 15/40
[52] U.S. Cl. .................................................... 364/300
[58] Field of Search ... 364/200 MS File, 900 MS File, 364/300

[56] References Cited

U.S. PATENT DOCUMENTS

3,670,310  6/1972  Bharwani et al. .................. 364/200
3,909,796  9/1975  Kitamura ............................ 364/900
4,255,796  3/1981  Gabbe et al. ....................... 364/900
4,318,184  3/1982  Millett et al. ...................... 364/900
4,358,824  11/1982 Glickman et al.* ................. 364/200
4,429,385  1/1984  Cichelli et al. ..................... 370/92

Primary Examiner—Raulfe B. Zache
Attorney, Agent, or Firm—Charles Scott Phelan

[57] ABSTRACT

Database locations for user-supplied query keywords are individually determined. Those locations for the full set of query keywords and for successively smaller groups of such query keywords are screened for locations common to all words of a group. The screening is stopped after all query keywords have been considered and found to have been included in at least one of the tested groups of query keywords having a common database location.

8 Claims, 8 Drawing Figures

FIG. 4 h≥ - HIERARCHICALLY GREATER THAN OR EQUAL
<ℓ - LEXICOGRAPHICALLY LESS THAN
<h - HIERARCHICALLY LESS THAN

KEYWORD SEARCH AUTOMATIC LIMITING METHOD

This invention relates to a method for computer-assisted keyword searching of textual database information; and it relates, in particular, to such a searching method which is useful in computer-assisted instruction systems.

BACKGROUND OF THE INVENTION

There are a variety of keyword retrieval systems known in the art, but they generally do not take into account the special needs of a student working on a computer-assisted instruction system. Such a student is often unfamiliar with the instruction system, and also unfamiliar with the subject matter of the course in which the student happens to be engaged. Some examples of retrieval schemes in the literature are indicated below.

A Bharwani et al. U.S. Pat. No. 3,670,310 teaches a storage and retrieval system employing link addresses for tracing a search path through plural files. Retrieval is based on the use of keywords provided by a user and, by that user, joined by connectors. The retrieval of specific information is based upon the frequency of occurrence of the input keyword that happens to be found in the target database.

A U.S. Pat. No. 4,255,796 to Gabbe et al. shows an associative searching arrangement which uses query masks and requires user feedback from time to time during the course of a search in order to narrow the focus of the search.

A Millett et al. U.S. Pat. No. 4,318,184 shows an information storage and retrieval system and method in which the entry of keywords causes nodes, or paths, in a hierarchical information tree structure to be identified by binary bitstrings that can be logically combined to define a set of paths. Those paths may then be traced for accessing all data in the database corresponding to the input keywords.

Glickman et al., in the U.S. Pat. No. 4,358,824, show a retrieval system which interprets a user's free-form query; and, in doing so, the system employs a parts-of-speed directory to select items from a document. The relative importance of keywords is weighed, and the documents with the largest retrieval values are selected for retrieval.

SUMMARY OF THE INVENTION

A text database is searched for a full, free-form set of keywords input by a user to determine whether or not all words of the set are included in at least one of plural predetermined subdivisions of the text. If the set is found, it is displayed to the user, along with indications of the locations where found in the text; and further searching is discontinued. However, if it is not so found, the system then automatically takes successively smaller-sized subsets of the total number of keywords in the original input set and similarly determines whether or not all words of the subset are included in at least one text subdivision. At each successively smaller subset size level, the results of the determination are checked to determine whether or not each keyword of the original set of keywords input by the user has been found in at least one set or subset of the original keywords. When all keywords have been so found, the program discontinues and displays the results to the user, as previously noted. In the ultimate, the process continues until only single keywords are made the object of the determination; and then, of course, all will be found if they are included in the text database at all.

In one embodiment of the invention, the text database is the courseware for a computer-assisted instruction system for delivering the courseware; and the text comprises a plurality of topic statements for the various topics of the course. Those statements include the text comprising the topic and topic keywords characterizing the individual topic contents. In addition, when the courseware is compiled, numerical tags identifying the topic positions in a hierarchical outline form of the course are assigned to the topics and to the keywords.

BRIEF DESCRIPTION OF THE DRAWING

A more complete understanding of the invention and the various features, objects, and advantages thereof may be obtained from a consideration of the following Detailed Description in connection with the appended claims and the attached drawing in which

DETAILED DESCRIPTION

Figure 1:
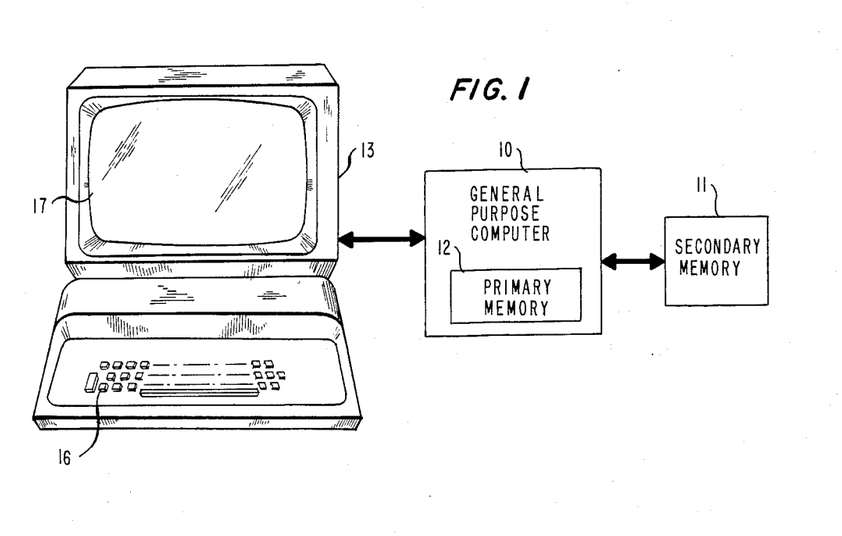
FIG. 1 is a simplified diagram of an illustrative hardware equipment assemblage in which the invention is used.

FIG. 1 is a simplified equipment arrangement for the delivery of computer-assisted instruction courseware; and, although it is so adapted, it is to be understood that the present invention, which is useful therein, is also useful in other arrangements for computer-assisted, information storage and retrieval. A general purpose computer 10 is associated connectively with a secondary memory 11 for supplementing the internal primary memory 12 normally included in the computer system. Computer 10 is advantageously a PDP1170 general purpose computer of the Digital Equipment Corporation employing an operating system such as the UNIX TM operating system version 7.0, which is available from the American Telephone and Telegraph Company. The UNIX operating system is described in a group of papers constituting the July-August 1978, issue of the *Bell System Technical Journal,* Vol. 57, No. 6, Part 2. The keyword retrieval system of the present invention advantageously operates under that operating system.

Also coupled to the computer 10 is a conventional computer terminal 13 having a full ASCII keyboard 16 for user entry of data and commands in connection with the utilization of the computer-assisted instruction system. Included in the terminal is a cathode ray tube display screen 17 for displaying to the user both information being input by the user, and interactive responses from the computer system, some of which will be subsequently discussed in greater detail herein.

Figure 2:
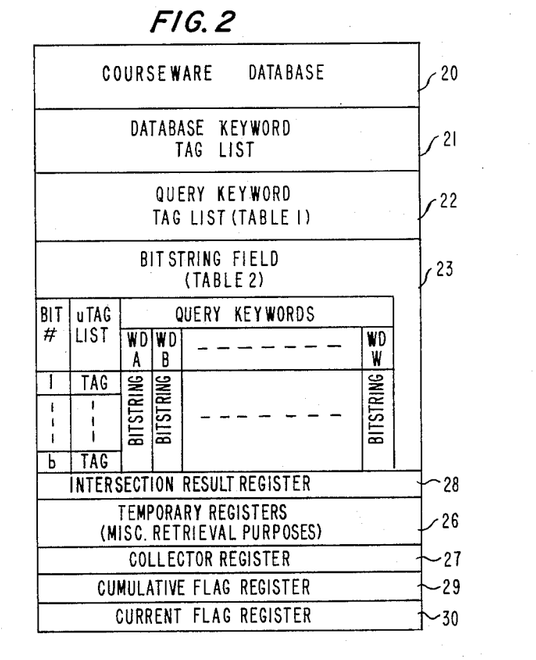
FIG. 2 is a memory map for a portion of the memory included in a computer system in FIG. 1.

FIG. 2 is a partial memory map of portions of the primary and secondary memory arrays represented in the system of FIG. 1. Included are only those portions of the computer system total memory which are referenced in the following description of the keyword searching method of the invention. Thus, there are included in the memory a courseware database portion 20 containing the text materials which comprise the computer-assisted instruction course. Other fields are included in the memory map and comprise portions which will be further discussed as the description proceeds. These other portions include, for example, a database keyword tag list (DKL) field 21, a query keyword tag list (QKL) field 22, a bitstring field 23, and a field 26 of temporary registers for providing various temporary storage facilities, such as query keyword sets and keyword sets found in the course of searching.

The illustrative computer-assisted instruction system is designed to present information in the form of hierarchically organized topics. Hierarchical organization is useful for gathering topics together into a systematic index, or table of contents. As an example of hierarchical organization, a repair manual on the maintenance of an automobile may be subdivided into sections which correspond to the major components of the automobile, such as the engine, the body, and the transmission. Typically, the subdivision of the manual continues until the complexity of the encapsulated knowledge has been reduced to that of a simple concept. A topic on engines would have a topic on carburetors as one of its subdivisions, and the topic on carburetors would be further divided into smaller topics.

A course author can assign an arbitrary number of keywords to a topic. In general, the assignment is based upon the content of the topic. In the foregoing example, the keyword "carburetor" might be assigned to the topic on carburetors, as well as the ancillary keywords "Venturi" and "Bernoulli," which pertain to the underlying physical principles of carburetion.

An author may exploit a hierarchical organization of topics when assigning keywords. A keyword refers, not only to the topic to which it was explicitly assigned, but to all topics included under that topic in the hierarchical organization. In the foregoing example, the keyword "engine," assigned to the topic on engines, would also refer to the topic on carburetors.

In the illustrative keyword retrieval system, there is advantageously no reserved list, i.e., no table of contents, of keywords required to be supplied to a user in order to take advantage of the keyword retrieval mechanism. It is assumed that the author takes care to ensure that the assignment of keywords is rich and numerous, i.e., including both terms used by the author and their synonyms, so that there will be a strong probability that a word entered by the user will match one of the keywords. Thus, the interface between machine and user can be simplified to the point where the user need only enter a list of words believed by the user to describe the subject matter to be located, i.e., a free-form multi-word subject.

In the illustrative embodiment, the computer-assisted instruction system has tags assigned to the topics therein to indicate the locations of the topics in the hierarchy of the overall course subject matter. It will be shown, however, that the employment of these numerical hierarchical tags is not essential to the invention. Each hierarchical tag is in the form of a left-to-right-ordered set of numbers separated by dots, i.e., a decimal outline-type of hierarchy. Each number in the set refers to a particular topic at a particular level in the hierarchy. For example, tags 2.3 and 2.4 refer to topics which are both subtopics of the topic referenced by a tag 2. Topic 2.3.2 is a subtopic of topic 2.3. Another way of stating this is that the topic 2 is hierarchically greater than any of the topics 2.3, 2.4, or 2.3.2. That is, a first tag is hierarchically greater than a second tag if its set has fewer numbers than the set of the second tag, and the numbers of the first tag comprise the prefix of the second tag. The concept of one topic being hierarchically greater than or less than another topic will be utilized subsequently in the description of the illustrative implementation of the method of the present invention.

Keywords that an author assigns to a topic are stored in memory along with a list, for each keyword, of topic tags indicating every location of that keyword in the course database. This keyword and tag portion of the database is the database keyword tag list 21 mentioned in connection with FIG. 2. An illustration of the relation between topic tags and the hierarchical organization is indicated below where the indentation of topic tags is used further to suggest the hierarchical ordering represented by the tags:

1. Automobile
   1.1 Engine
      1.1.1 Carburetor
      1.1.2 Alternator
   1.2 Body
   1.3 Transmission
2. Locomotive Where more than one number is included in a tag to indicate topical subdivisions, the various numbers are separated by periods. As a part of the process of delivering a course in a computer-assisted instruction system and, e.g., when the courseware database is loaded into the memory of the hardware portion of the system, all topic keywords from the respective topic definitions are copied into the database keyword tag list, along with their respective hierarchical numerical tags, to become the list field 21 mentioned in connection with FIG. 2. Those tags are advantageously listed in the lexicographical order of their topics. Lexicographic ordering of two tags is determined by the relative magnitudes of their numbers in the first number position in the order of the set in which they differ. Thus, that list includes a plurality of author-assigned keywords which are advantageously stemmed by the process to remove word ending differences that unnecessarily complicate the database search procedure. Likewise, the keywords are stored in alphabetical order for efficiency of retrieval. Accordingly, it is not necessary to apply a parts-of-speech algorithm to remove stop words and other less effective words for information retrieval. Processes for stemming and alphabetizing words are well known in the art and comprise no part of the present invention.

In order to utilize a keyword-based searching system in accordance with the present invention, a user enters at the keyboard 16 the set of desired keywords that the user believes will adequately define the topic subject matter that is sought in the courseware database. This list of keywords is entered in free form without the requirement for conjunctive or disjunctive connectors or prescribed syntactic association or other special procedures that may imply at least a limited level of skill in utilizing a searching system. It is the purpose of the keyword retrieval system of the present invention to use that free-form list of keywords provided by a user to produce a display of those words, along with at least their respective locations, i.e., their respective hierarchical numerical designations, which have a high likelihood of corresponding to what the user seeks. Other related information, such as associated topic titles, may also be displayed.

Figure 3:
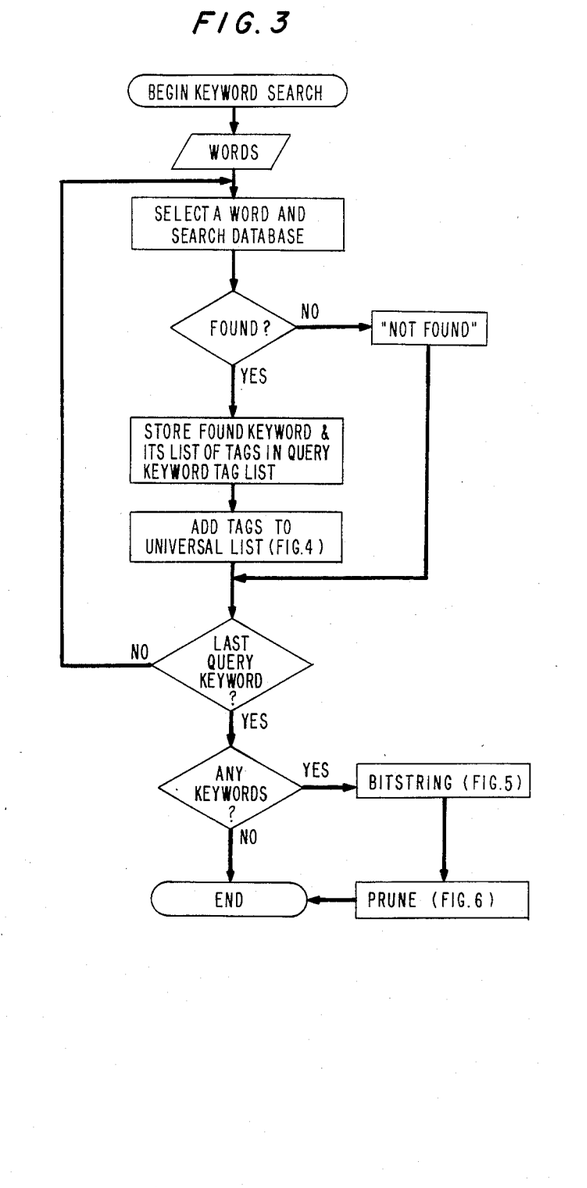
FIGS. 3 through 7 are computer-programmable process flow diagrams illustrating the operation of a keyword-based information retrieval method using the invention.

The retrieval method illustrated in FIG. 3 focuses on those keyword locations shared by the greatest numbers of input keywords. In connection with FIG. 3, it is initially and illustratively assumed that a user has supplied a set of six words, or characters, as input for the search. The query words illustratively entered by the user include "data, files, buffer, mm, text, editor;" and those words are entered without requirement for punctuation or capitalization. It is advantageously required that they must be entered all on a single line in the display 17 in order to encourage the user to focus, to some degree, the field of search in which the user is interested. The one-line list of words is considered on a word-by-word basis by the process.

First, each word is preprocessed to facilitate consideration. All letters are advantageously forced to the lower case condition if they had not originally been in that state. Next, the words are stemmed to remove variations in the form of the words due to different endings. For example, the input words previously mentioned include the word "files," which would be stemmed to the word "file," and the word "editor," which would be stemmed to the word "edit." Computer-based processes for accomplishing a stemming function are well known in the art and comprise no part of the present invention. One illustrative such process is used in a J. B. Lovins paper, "Development of a Stemming Algorithm," *Mechanical Translation,* 11:22-31 (1968). The stemmed query keywords are then stored in the temporary register area 26 of memory in a query keyword register to be held there for individual word accessing during the search process.

Next, a query keyword is selected from the mentioned query keyword register; and a search is done in the database, by searching the database keyword list field 21, for any matching keywords. If the selected query keyword is not found, i.e., if it does not have a corresponding stem in the database keyword list, it is displayed, along with the label "not found;" and then that query keyword is discarded insofar as further searching and retrieval are concerned. A test is then made automatically to determine whether or not the selected, but not found, query keyword is the last such word in the query keyword register; and, if not, the process loops back to select a new word again and search the database for this newly slected query keyword. If the newly selected query keyword is found in the database, the search stops; a keyword-found counter in field 26 is incremented; and a flag is set to indicate the fact. Thereafter, the keyword is stored in a query keyword tag list (field 22 in FIG. 2), along with all hierarchical numerical location tags associated therewith from the database keyword tag list field 21. Those tags are advantageously copied into field 22 in lexicographical order to simplify future processing. These words are also stored as words WD A, WD B, etc. in a bitstring field 23 in FIG. 2. Their respective sets of tags will be used in building, in field 23, a universal list (UTAG list to be described as to FIG. 4) of found keyword tags for employment subsequently in a manner to be described. A tabular illustration of a query keyword tag list is shown below in Table 1.

TABLE 1

| Tag No. | buffer | edit | file | mm | text | data |
|---|---|---|---|---|---|---|
| 1 | 1.2.1.2 | 1.2 | 1.1 | 3 | 1.2 | 4.4.3 |
| 2 | 2.1.2 | 2 | 1.2.2 | 4.4.3 | 1.4 | 4.5 |
| 3 | 2.4.1 | | 1.4 | 4.6 | 3.1 | |
| 4 | 2.6.3 | | 1.5.1 | | 3.2.5 | |
| 5 | | | 1.5.2 | | 3.2.7 | |
| 6 | | | 1.5.3 | | 3.3.3 | |
| 7 | | | 1.5.4.1 | | 3.4.4 | |
| 8 | | | 1.5.5 | | 3.4.5 | |
| 9 | | | 2.3.7 | | 4.1 | |
| 10 | | | 2.4.1 | | 4.5.1 | |
| 11 | | | 3.1.1 | | 4.5.5 | |
| 12 | | | 3.3 | | | |
| 13 | | | 4.6 | | | |

Each keyword entered by the user as a part of the user's query is considered to be the name of a lexicographically ordered set of hierarchical tags representing topical locations where that query keyword is found in the database. Referring to Table 1, for example, the keyword "edit" is the name of a set of tags which contains two hierarchical tags, namely, 1.2 and 2, as shown in the column of Table 1 under the word "edit." Following the consideration of any particular set of query keyword tags in connection with the universal list, the process in FIG. 3 then, once more, checks to determine whether or not the last query keyword of the set has been sought in the database keyword list. If not, the process loops back to select and search for a new query keyword.

If the last keyword of a set of query keywords has been considered, the process then tests the keyword-found counter in field 26 in the memory to determine whether or not it is null and thus indicating that no keywords were found. A non-null state means that at least one of the query keywords has been found in the course of the search. If no query keywords were found in the database keyword tag list, the process then ends by displaying to the user a notice indicating that none of the query keywords has been found. Alternatively, if at least one query keyword was found in the database keyword tag list, the process then calls a BITSTRING subroutine, illustrated in, and to be discussed in connection with, FIG. 5 for completing the construction of the bitstring list of memory field 23 and the Table 2 previously mentioned. That subroutine produces the Table 2 bitstrings which correlate the query keywords there with the universal list tags.

Following completion of the bitstring list, the process then proceeds to select one or more subsets of the list by identifying therein only those sets of keywords which have the maximum desirable utility as measured by the full set of query keywords. This elimination process for less useful keyword sets is sometimes called pruning; and it is illustrated in, and will be described in connection with, a PRUNING subroutine illustrated in FIG. 6. Upon completion of that subroutine, the most relevant keyword combination locations will have been identified for the user and are displayed in a manner to be subsequently indicated. The FIG. 3 process is then at an end.

Figure 4:
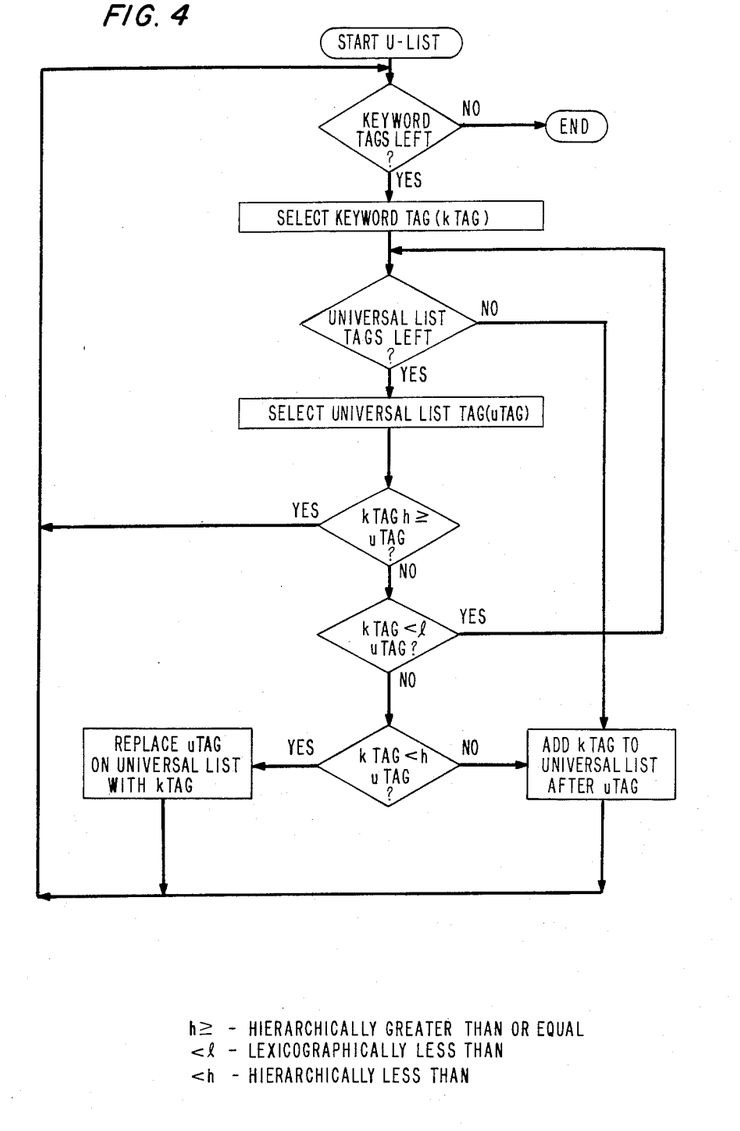

FIG. 4 illustrates detail of the FIG. 3 step of adding appropriate ones of the tags of a found query keyword of the universal list. The FIG. 4 process constructs the universal list of tags in lexicographical order of their topics in accordance with three rules which are applied to each tag of a newly found query keyword. Those rules are based upon the fact that tags of a query keyword are considered in lexicographical order, and the fact that the universal list construction process inherently causes that list to be formed in lexicographical order. The rules are based upon both hierarchical and lexicographic comparisons of keyword tags indicating topical positions of the keywords in the database. In a lexicographical comparison, one tag is greater than another if, in the most significant order in which they differ, its number is greater. In a hierarchical comparison, one tag is greater than another if it has fewer orders of numbers; and its numbers in those orders are the same as the numbers in corresponding orders of the longer tag. A lexicographic comparison involves a character-by-character ordering as in the making of a dictionary. In the present context, it is used for a number-by-number series of comparisons of tags, starting at the hierarchically most significant number, i.e., the left-most number, and ending when a mismatch occurs. At the point of mismatch, the relative magnitudes determine the lexicographical order. Although lexicographic comparison makes the operation efficient, its use is not essential to the invention.

The first rule for universal list construction is that if a tag of a found query keyword is not included already on the universal list (and, of course, no tags would be included for the first found keyword of a query), and if the tag is not hierarchically greater than another universal list tag in the same branch, or sequence, of the hierarchy, or less than any other tag on the same branch, or sequence, of the hierarchy, then that tag is added to the universal list in a position determined by a lexicographic comparison function.

A second rule for the construction of the universal list is that, if the tag of the found query keyword is not already found on the universal list, and if it is hierarchically less than a tag which is already on the list in the same hierarchical branch, then, the latter tag is replaced on the universal list with the tag under consideration of the most recently found query keyword.

Thirdly, if the most recently found query keyword tag under consideration is found on the universal list already, or if that tag under consideration is hierarchically greater than a tag which is already on the universal list, then this tag under consideration is not again added to the universal list.

The universal list, constructed in the manner outlined, is included as a column (UTAG LIST) of data in a bitstring list which is constructed and stored in the field 23 of the FIG. 2 memory map. One bitstring list comprising the aforementioned six illustrative query keywords, and a universal list for those keywords, is included in the following Table 2:

TABLE 2

| Bit No. | universal list | Bitstring List | | | | | |
|---|---|---|---|---|---|---|---|
| | | buffer | edit | file | mm | text | data |
| 1 | 1.1 | 0 | 0 | 1 | 0 | 0 | 0 |
| 2 | 1.2.1.2 | 1 | 1 | 0 | 0 | 1 | 0 |
| 3 | 1.2.2 | 0 | 1 | 1 | 0 | 1 | 0 |
| 4 | 1.4 | 0 | 0 | 1 | 0 | 1 | 0 |
| 5 | 1.5.1 | 0 | 0 | 1 | 0 | 0 | 0 |
| 6 | 1.5.2 | 0 | 0 | 1 | 0 | 0 | 0 |
| 7 | 1.5.3 | 0 | 0 | 1 | 0 | 0 | 0 |
| 8 | 1.5.4.1 | 0 | 0 | 1 | 0 | 0 | 0 |
| 9 | 1.5.5 | 0 | 0 | 1 | 0 | 0 | 0 |
| 10 | 2.1.2 | 1 | 1 | 0 | 0 | 0 | 0 |
| 11 | 2.3.7 | 0 | 1 | 1 | 0 | 0 | 0 |
| 12 | 2.4.1 | 1 | 1 | 1 | 0 | 0 | 0 |
| 13 | 2.6.3 | 1 | 1 | 0 | 0 | 0 | 0 |
| 14 | 3.1.1 | 0 | 0 | 1 | 1 | 1 | 0 |
| 15 | 3.2.5 | 0 | 0 | 0 | 1 | 1 | 0 |
| 16 | 3.2.7 | 0 | 0 | 0 | 1 | 1 | 0 |
| 17 | 3.3.3 | 0 | 0 | 1 | 1 | 1 | 0 |
| 18 | 3.4.4 | 0 | 0 | 0 | 1 | 1 | 0 |
| 19 | 3.4.5 | 0 | 0 | 0 | 1 | 1 | 0 |
| 20 | 4.1 | 0 | 0 | 0 | 0 | 1 | 0 |
| 21 | 4.4.3 | 0 | 0 | 0 | 1 | 0 | 1 |
| 22 | 4.5.1 | 0 | 0 | 0 | 0 | 1 | 1 |
| 23 | 4.5.5 | 0 | 0 | 0 | 0 | 1 | 1 |
| 24 | 4.6 | 0 | 0 | 1 | 1 | 0 | 0 |

Now, the universal list construction process U-LIST, using the aforementioned three rules, will be described in connection with FIG. 4. A first step is to determine whether or not there are any unconsidered tags associated with the query keyword. If none, e.g., as for the case where all tags of a found query keyword have been considered, the process returns to the FIG. 3 search routine at the last keyword test. However, on the initial call of this universal list routine for a query keyword, there will be a keyword tag left; and the first, or next, such tag (ktag) is selected as appropriate.

A test is made for any remaining universal list tag (utag) which has not been considered with the ktag. If there is none, the ktag just selected is added to the universal list after the most recently added, if any, utag; and the process loops back to test for further ktags. However, assuming a remaining utag, the first, or next, such utag is selected as appropriate.

Now, the last selected ktag is tested to determine whether or not it is hierarchically at least equal to the last selected utag. In a hierarchical comparison, a series of number comparisons are made, starting from the most significant number position, as in a lexicographic comparison, and ending again when a mismatch occurs at a number position in which there is no ktag number. In the latter case, the ktag can never appear in a display to a user, so the process loops back to select a new ktag without considering any other utags; and, therefore, the third rule has been satisifed. In the former case, a lexicographic comparison is required to determine whether or not the current utag is required for further comparison.

If the ktag is lexicographically at least equal to the utag, another hierarchical test is made to determine whether or not the current ktag is hierarchically less than the current utag. If the test result is negative, the first rule has been satisfied, and the ktag is added to the universal list after the most recently added utag; and the process loops back to test for further ktags. If the test is affirmative, the utag can never appear in a display to the user, so it is replaced by the ktag on the universal list; and the process loops to test for further ktags.

Figure 5:
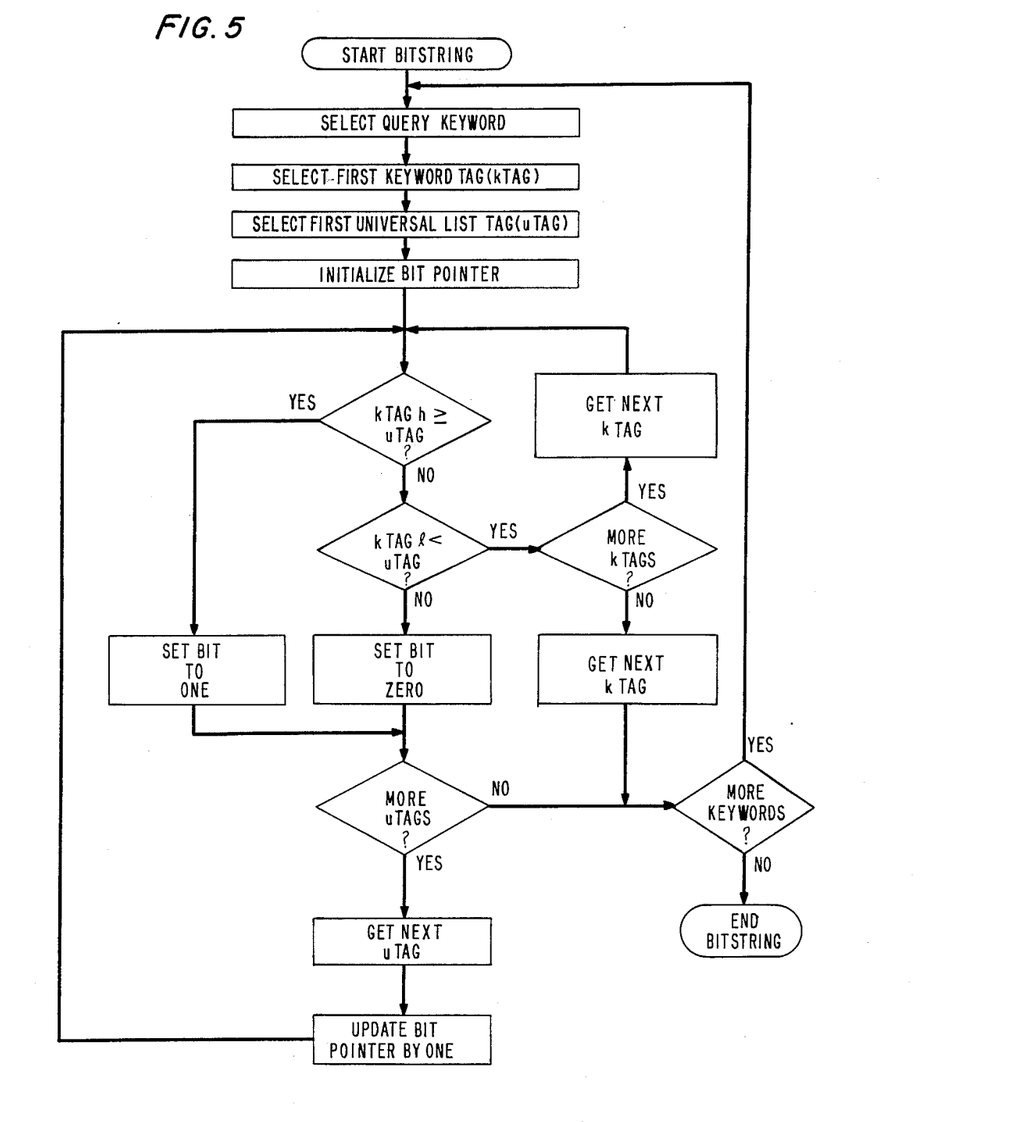

FIG. 5 depicts the BITSTRING subroutine process mentioned in connection with FIG. 3 and relating to the bitstring list of Table 2. Table 2 includes what might be considered ordinates in the form of bit numbers and the universal list of keyword tags; and it includes what might be considered abscissas in the form of the keywords of the user query. It remains, then, to secure the necessary binary ONE and ZERO information for filling in the columns of Table 2 to indicate whether or not a particular keyword is associated with any particular tag on the universal list. In the bitstring list of Table 2, a string of binary ONE and ZERO bits appears in the column beneath any particular keyword and represents the bitstring for that keyword. The bitstrings are also indicated in memory field 23 in FIG. 2 where they are stored with their respective keywords and associated utags. Each bit of the bitstring is set to a binary ONE or ZERO, depending upon whether or not an element of the universal list in Table 2 is also an element, or is hierarchically less than an element, of the particular keyword set of tags in Table 1. The process indicated in FIG. 5 depicts the method for determining and setting the binary ONE and ZERO bits of a bitstring for a simple keyword in Table 2.

The first step in the process of FIG. 5 is to select the first, or next, found query keyword in the query keyword tag list field 22. The next step is to select the first ktag for that query keyword. Then, the first utag is selected from the universal list of Table 2.

A bit pointer in memory field 26 is initialized to the bit number, in Table 2 and field 23, of the universal list tag just selected to provide a marker in field 23 for return when it is time to set a bit state.

Now, the selected ktag for the Table 1 query keyword is hierarchically compared with the utag selected from the Table 2 universal list to determine whether or not the ktag is at least equal to the utag. This is the same type of comparison previously carried out in constructing the universal list, and which stops at the number order of the first mismatch or at the number position in the ktag where there is no number. In the latter case, the ktag is hierarchically greater than or equal to the utag, and the bitstring bit corresponding to both that tag and the ktag is set to the binary ONE condition. Next in the process of FIG. 5, a test is made to determine whether or not the last utag has been considered for the current keyword. If there are more, the process selects a new utag, increments the bit pointer, and loops back to compare the new utag with the same ktag for the Table 1 query keyword. However, if the last utag had been considered, a test is made for more found query keywords; and, if none, the process ends for this subroutine; and control is returned to the FIG. 3 keyword search process to initiate the pruning operation previously mentioned. However, if there are more query keywords to be considered, the process loops back to select the next query keyword.

Returning to the FIG. 5 hierarchical tag comparison decision step, if the comparison revealed that the Table 1 query keyword list ktag is not greater than or equal to the Table 2 universal list utag, and if the query keyword list ktag is lexicographically not less than the universal list utag, the pointed bit in the keyword bitstring is set to ZERO. That setting indicates the absence of the universal list tag from the query keyword tag list, either directly, or as an hierarchical subordinate. Returning to the FIG. 5 lexicographical tag comparison decision step, if the comparison produces an affirmative result, a test is made to determine whether or not the last ktag of the set for the keyword has been considered. If it has, a test is made for the next query keyword as before. However, if the last ktag has not been considered, a new ktag is selected from the query keyword list in Table 1 for the same keyboard. The process then loops back to the hierarchical tag comparison test with the same utag.

The retionale for the bitstring representation is that intersections among bitstrings can be performed by bit operations, which are expected to be fast on a computer. An "intersection" in this context is an additional bitstring which indicates, for a given set of query keywords, whether or not they all share any of the utags, and which ones, if any. The term is also used to indicate the process of finding that sharing state. The result of an intersection of a number n of bitstring sets will determine which utags have the corresponding keywords in common. In the illustrative example, to determine if any topic (represented by a utag) has six keywords in common, an intersection is done among the six bitstrings; but it can be seen in Table 2 that such an intersection would show that no topic has six keywords in common. An intersection of one set of three-keyword bitstrings is shown below in Table 3. As can be seen in the column on the right labeled "AND," bit number 12 is the only nonzero bit, i.e., the only bit which is in the ONE state for every one of the query keywords of the three-keyword set listed across the top of Table 3. This corresponds to the fact that the tag 2.4.1 (bit No. 12 in Table 2) has the three keywords (buffer, edit, and file) shown at the top of Table 3 in common.

TABLE 3

| Bit No. | Intersection of Bitstrings | | | |
|---|---|---|---|---|
| | buffer | edit | file | AND |
| 1 | 0 | 0 | 1 | 0 |
| 2 | 1 | 1 | 0 | 0 |
| 3 | 0 | 1 | 1 | 0 |
| 4 | 0 | 0 | 1 | 0 |
| 5 | 0 | 0 | 1 | 0 |
| 6 | 0 | 0 | 1 | 0 |
| 7 | 0 | 0 | 1 | 0 |
| 8 | 0 | 0 | 1 | 0 |
| 9 | 0 | 0 | 1 | 0 |
| 10 | 1 | 1 | 0 | 0 |
| 11 | 0 | 1 | 1 | 0 |
| 12 | 1 | 1 | 1 | 1 |
| 13 | 1 | 1 | 0 | 0 |
| 14 | 0 | 0 | 1 | 0 |
| 15 | 0 | 0 | 0 | 0 |
| 16 | 0 | 0 | 0 | 0 |
| 17 | 0 | 0 | 1 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 0 | 0 |
| 24 | 0 | 0 | 1 | 0 |

Figure 6:
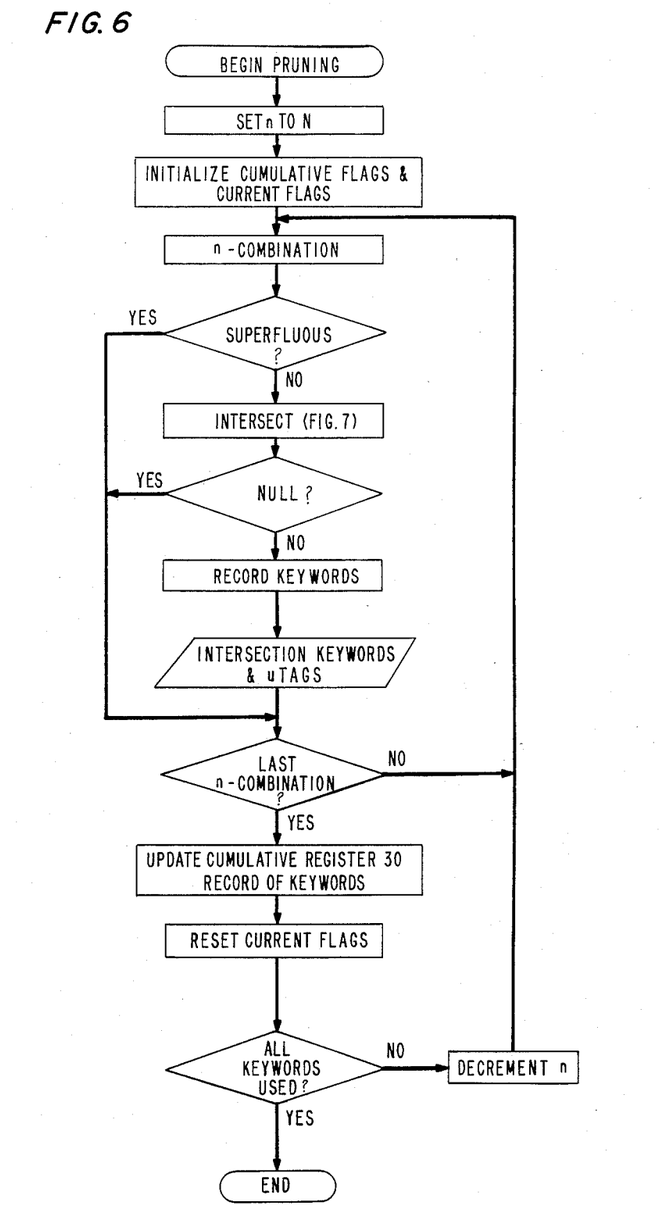

FIG. 6 depicts the subroutine, hereinbefore mentioned in connection with FIG. 3, for the so-called PRUNING operation. In this subroutine, a collector register 27 and two flag registers 29 and 30 are employed; and each includes a binary bit flag in a predetermined bit position for each query keyword. The universal list construction is complete, and a bitstring has been formed for every query keyword found in the database. Now, in the pruning subroutine, systematic intersections will be performed on the bitstring to focus the search results on one or more topics (represented by utags) of narrowest scope and greatest apparent user interest, as represented by the largest numbers of found query keywords contained therein.

Potentially, there can be many topic locations, i.e., tags, on the universal list. To minimize the display of topic titles in the ultimate search result in some meaningful manner, without user intervention, combinations of different orders of intersections are performed on the keyword sets in Table 2 to reduce the number of topics that must be displayed to those which have the most keywords in common. For the purpose of this description, an n-combination is a selection of any number n of distinct objects from N objects in a total. An nth order intersection is the intersection together of all bitstrings in a particular n-combination of the N objects. If n/N is small, the number of nth order intersections possible is large; and if n=N, the number is unity.

The first step in the PRUNING process of FIG. 6 is to set an indexing counter in field 26 of the FIG. 2 memory map to the number of keywords on Table 2, i.e., n=N. The next step is to initialize all flags in the cumulative flags register 29 to indicate that none of the query keywords has been employed in an intersection at a prior nth order. All flags in the current flags register 30 are similarly initialized to indicate no prior intersections in the current nth order. The next step is to select an n-combination of the keywords; and, at this initial stage, only one is possible. That selection is achieved by employing n pointers which point to the query keywords, respectively, of the selected n-combination. That is, n, multibit, binary coded words are the pointers. Initially, all of the query keywords are pointed at once. At lower orders, i.e., values of n, there are fewer pointers for any combination of keywords, but more combinations. Accordingly, if the keywords are assumed to be in a numerical sequence of locations, and the pointers are systematically varied to select all of the possible n-combinations of the nth order, the nth, or least significant, pointer varies most rapidly from set n to set N. Similarly, the first, or most significant, pointer varies most slowly from set 1 to position (N−n+1).

Next, in FIG. 6, the process checks whether or not the selected n-combination of keywords is superfluous, that is, to see if all keywords corresponding to the selected n-combination have already been included as a subset of an n-combination for a previous, i.e., larger, value of n found to include an intersection. That determination is made by checking the flags for each of the query keywords for the current n-combination in the cumulative flags register 29. If all are set, the combination is superfluous. If an n-combination under consideration is superfluous, i.e., all of its words have been previously found, the process jumps ahead to test whether or not the current n-combination is the last n-combination of the nth order; and, if it is not, the process loops back to select a new n-combination. However, if the current n-combination is not superfluous, the process proceeds to calculate the intersection of the corresponding bitstrings in a manner which is hereinafter considered in connection with FIG. 7.

The output of the intersection operation is either high or null to indicate that either the intersection found at least one coincidence of binary ONE bits in a corresponding bit position in all of the columns corresponding to the keywords of the selected n-combination; or it is null, indicating that, for every utag, at least one of the keywords in the n-combination set had a binary ZERO in its bitstring at the bit position for the universal list tag under consideration. If a null is found, the process jumps ahead, as previously mentioned, to test whether or not the last of the n-combinations has been considered at this nth order. However, if no null is found, i.e., if an intersection is found, for each query keyword in the n-combination, a corresponding flag in the current flags register 30 is set to record the keywords for that n-combination. Also, the same keywords, along with the universal list topic title tags associated therewith through the one or more sets of all-ONE bits identified by the nth order non-null intersection just detected, are loaded into a collector register 27.

Next, the process tests to determine whether or not the last n-combination at this order of n has been considered, as indicated in FIG. 6. If the last has not been considered, the process loops back to select a new n-combination and repeat the intervening steps to collect in register 27 any additional n-combinations of keywords and their associated universal list tags which are identified in the inersection. However, if the last n-combination has been considered, the process updates register 30 by setting all those flags in the cumulative flags register 29 that are set in the current flags register 30, and then clears register 30. Then, if all flags of register 29 are set, all keywords have been used. If they have not been so used, the value of n is decremented; and the process loops back to select a new set of keywords using the new value of n. This looping continues until all of the keywords have been found in at least one intersection which is not superfluous. When all keywords have been so used, the subroutine of FIG. 6 ends; and control is returned to the main program in FIG. 5 to indicate the end of the keyword search. At that point, the search results, comprising the n-combinations of keywords and associated utags from collector register 27, are displayed.

In the illustrative example, which started with six keywords, the intersection of all bitstrings for all six keywords is null, as can be seen in Table 2. This means that there is no topic in the courseware which is common to all six of the keywords. This is also true for the six subsets of those six keywords at the nth order where n=5, that is, for the six subsets of five keywords; and it is further true of the thirty subsets of n=4 keywords. Not until combinations including only n=3 keywords are formed does an intersection appear which is not null. Such an example is illustrated in Table 3, and the topics from that intersection are indicated below:

buffer editor text 1.2.1.2 editor files text 1.2.2 buffer editor files 2.4.1 files mm text 3.1.1

3.3.3

The PRUNING process then continues with the intersections between nonsuperfluous n-combinations of two bitstrings. When this level is completed, the foregoing n=3 combinations in register 27 are augmented by the n=2 combinations shown below:

mm data 4.4.3 data test 4.5.1

4.5.5

It will be noted from the foregoing that the only intersections involving n=2 keywords that are presented are those due to the combinations of the keywords "data," "mm," and "text." All other combinations involving two keywords are not displayed, since they are subsets of previous combinations involving three or more keywords that had non-null intersections.

The search process need not continue in the illustrative case to the state of n=1, since any other combinations of keywords will be subsets of prior combinations. This state is reached when all keywords have been used in some combination involving non-null intersections.

Usually, the number of universal list topic location tags displayed to the user can be significantly reduced from the original number of query keyword tags received from the database and placed in the query keyword tag list of register 22. In the foregoing example, a total of eight utags for six n-combinations were presented to the user out of the original 29 ktags associated in Table 1 with the query keywords which the user had offered. Keywords that refer to a single topic, i.e., have but one ktag, will return fewer utag topic locations than keywords that have multiple ktags. Thus, the keyword information retrieval mechanism is biased towards the person looking for a specific topic who supplies words designed to narrow the alternatives. On the other hand, the system also responds to the user who enters words that have no topics in common.

Figure 7:
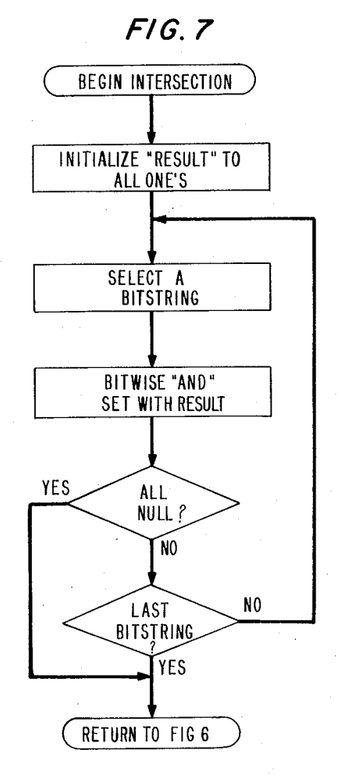

In FIG. 7 is shown the intersection subroutine utilized in the FIG. 6 pruning process. This subroutine takes each newly identified, nonsuperfluous, n-combination of query keywords, and identifies any utags common to them all. The first step in the intersection subroutine is to initialize, i.e., set to all ONEs, an intersection result register 28 in the FIG. 2 memory map. That register has enough bit locations to equal the maximum number of utags that might be expected to be used for a single query from a user.

A first, or next, bitstring for a keyword n-combination is then selected. This selected bitstring is then ANDed, e.g., in a bitwise fashion, with the corresponding bit contents of the aforementioned result register. The output of each AND operation is written back into the result register. At the end of the ANDing, there are ONEs in the result register for only the bit positions also having ONEs in the current bitstring used. An all-ZERO test of the result register contents will reveal a null result. If the result is null, there is no need to continue further, because there can be no non-null intersection with this n-combination; and the process jumps ahead to return control to the process of FIG. 6 from which it was called. On the other hand, if test outcome is negative, a test is made to determine whether or not the last bitstring of the n-combination has been considered. If it has not been considered, the process loops back to select a new bitstring and repeat the intervening operations. However, if the last bitstring has been considered, the subroutine ends; and control is returned to the FIG. 6 PRUNING subroutine.

Figure 8:
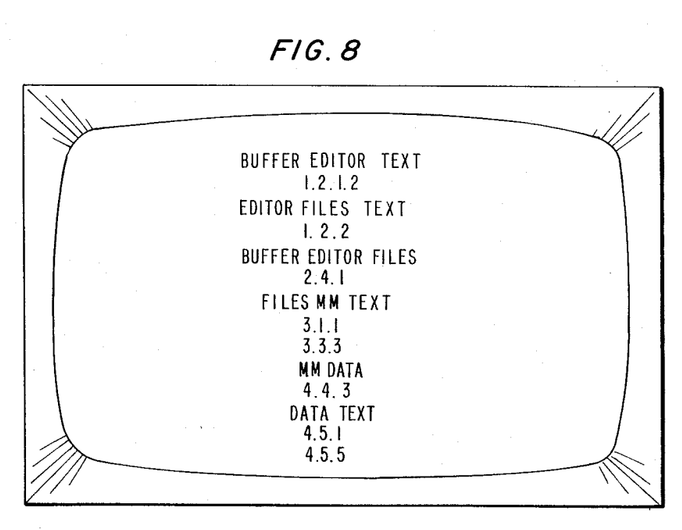
FIG. 8 is an illustration of a computer system terminal display showing a typical set of results of a keyword search in accordance with the present invention.

As previously indicated, in connection with FIG. 3, the final function in the search process is not actually indicated in the FIG. 3 process, but involves the display of the search results to the user. FIG. 8 illustrates an enlarged screen 17 with text therein illustrating the typical result, e.g., for the illustrative example, that is produced for the benefit of a user of the computer-assisted instruction system.

Although the present invention has been described in connection with a particular application and embodiment thereof, additional applications, embodiments, and modifications which will be obvious to those skilled in the art are included within the spirit and scope of the invention.

What is claimed is:

1. A method for retrieving query keyword locations in a textual database, the method comprising the steps of
   constructing a tabulation of all keywords of said database together with indications of their respective locations in said database,
   identifying at least one location in said database that is common to keywords of a query keyword set, said set including either all of said query keywords or at least two subsets of said query keywords, and
   limiting said identifying step to subsets that contain at least one keyword not included in a larger set having an identified common location.

2. The retrieving method in accordance with claim 1 in which said identifying step comprises the steps of
   selecting a user query keyword location indication,
   selecting a corresponding database keyword location indication, and
   comparing the relative magnitudes of said location indications and creating a bitstring with a bit for each corresponding database keyword location indication, a binary state of the bit being such that
   if said query keyword location indication is equal to, or greater than, said corresponding database location indication, such bit of said bitstring is set to a binary ONE, and if said query location indication is less than said corresponding database location indication, such bit of said bitstring is set to the binary ZERO state.

3. The retrieving method in accordance with claim 2 in which said limiting step comprises the steps of
   conducting intersections among bitstrings of keywords of respective sets of said query keywords, and
   halting said conducting step after every query keyword has been found to be included in at least one of either said set or one of said at least two subsets.

4. A keyword information retrieval method for locating, in a text database, subject matter represented by a multi-word set of user-supplied query keywords, the method comprising the steps of
   identifying locations in said database for keyword concepts represented by respective words of said query,
   constructing bitstrings, each having one bit position for each location where a query keyword is found, each bitstring for a different concept having a predetermined bit state in only those bit positions corresponding to unique ones of said locations where such concept is found in said database,
   selecting the fewest number of combinations of said bitstrings having among the strings of the combinations at least a corresponding one of said bit positions in each combination having a coincidence of said predetermined state for all bit strings of that combination, and wherein said fewest number of combinations of bitstrings include together at least one bitstring for each keyword of said query, and
   displaying, with combinations of query keywords corresponding to said fewest number of combinations of bitstrings selected, their respective database location identifications.

5. The keyword retrieval method in accordance with claim 4 in which
   said identifying step comprises the step of making a query keyword list of numerical location tags, each representing a database location of at least one of said concepts, said constructing step comprises the steps of
  forming a universal list of numerical locations tags, each representing a database location of at least one of said concepts, and
creating a bitstring for each query keyword, said creating step comprising the steps of
  selecting both a numerical location tag from among those produced in said identifying step and a location tag from among those in said universal list,
  comparing location tags selected in said selecting step, and
  entering said predetermined binary state in a bit position of said bitstring for the last-mentioned universal list location tag if said query keyword location tag is at least equal to said universal list location tag, and entering a different binary state in such bit position if said query keyword location tag is less than said universal list location tag.

6. The retrieval method in accordance with claim 5 in which said location tags are represented in a numerical hierarchically organized numbering system, and
said comparing step comprises the step of
  hierarchically comparing said query keyword location tags and said universal list location tags,
  entering said predetermined binary state in the corresponding bit position of said bitstring if said query word is higher in the same branch of the system hierarchy, or is equal to said universal list location tag, and
  entering said different binary state if said query keyword location value is otherwise in a different branch of said system.

7. The retrieval method in accordance with claim 4 in which said selecting step includes the steps of
  selecting combinations of said bitstrings of different size, starting with the largest possible combination of bitstrings,
  discarding any selected combination which has already been identified as having a non-null coincidence in prior processing, and
  performing intersections on each remaining combination of bitstrings to identify, among the combinations, bitstring bit positions which individually include coincidence of said predetermined state in at least one corresponding bit position of a combination.

8. The retrieval method in accordance with claim 7 in which said performing step comprises, in conjunction with a result register, the steps of
  setting said result register to said predetermined binary state in all bit positions of such register,
  ANDing a first one of said bitstrings of a combination with contents of said result register and overwriting the result into said register,
  successively ANDing each other remaining one of said set of bitstrings of the combination with the result of the last prior ANDing step and overwriting the result of each successive ANDing step into said register,
  testing the final result of all of said successive ANDing steps in said register for said predetermined binary state in any bit position thereof, and
  identifying the location tag of said any bit position in said final result.

* * * * *